(12) United States Patent
Yasutake et al.

(10) Patent No.: US 7,926,328 B2
(45) Date of Patent: Apr. 19, 2011

(54) SAMPLE MANIPULATING APPARATUS

(75) Inventors: Masatoshi Yasutake, Chiba (JP);
Takeshi Umemoto, Chiba (JP);
Masafumi Watanabe, Chiba (JP)

(73) Assignee: SII Nano Technology Inc., Chiba (JP)

( * ) Notice: Subject to any disclaimer, the term of this patent is extended or adjusted under 35 U.S.C. 154(b) by 435 days.

(21) Appl. No.: 12/129,149

(22) Filed: May 29, 2008

(65) Prior Publication Data
US 2008/0314131 A1  Dec. 25, 2008

(30) Foreign Application Priority Data

Jun. 1, 2007  (JP) ................................. 2007-146734

(51) Int. Cl.
*G01B 5/28* (2006.01)
*G02B 21/32* (2006.01)
*G01Q 30/20* (2010.01)
*B82B 3/00* (2006.01)

(52) U.S. Cl. ................. 73/105; 850/18; 850/40; 850/52; 850/56; 850/63; 977/962

(58) Field of Classification Search ........................ 73/105; 850/18, 40, 52, 56, 57, 62, 63; 977/962
See application file for complete search history.

(56) References Cited

U.S. PATENT DOCUMENTS

| | | | | |
|---|---|---|---|---|
| 6,862,921 B2 * | 3/2005 | Chand et al. | ................ | 73/105 |
| 7,574,903 B2 * | 8/2009 | Su et al. | ................ | 73/105 |
| 7,770,474 B2 * | 8/2010 | Yasutake et al. | ................ | 73/863 |
| 2008/0105044 A1 * | 5/2008 | Yasutake et al. | ................ | 73/105 |

OTHER PUBLICATIONS

Takekawa et al., "Development in AFM Tweezers for Manipulation of Nanometer Size Objects", Transaction of the Institute of Electrical Engineers of Japan, E2005, vol. 125, No. 11, pp. 448-453, 2005.

\* cited by examiner

*Primary Examiner* — Daniel S Larkin
(74) *Attorney, Agent, or Firm* — Brinks Hofer Gilson & Lione

(57) ABSTRACT

There is provided a sample manipulating apparatus which is an apparatus for manipulating a sample mounted on a substrate surface, in which at least position data and shape data are acquired by observing the sample. Thereafter, tweezers are positioned by moving means such that the sample is positioned between an observing probe and a grasping probe based on the two set of data. After positioning, a height of the tweezers is set to a position of being remote from the substrate surface by a constant distance by moving means while monitoring a result of measurement by displacement measuring means. Thereafter, the grasping probe is moved to a side of the observing probe while monitoring the result of measurement by the displacement measuring means at the set height and the sample is grasped while detecting a grasping start point.

12 Claims, 6 Drawing Sheets

$A_0 > A_1 > A_2$
$D_1 < \frac{1}{2} Hs$

SET POINT 1; point of distance $D_1$ of observing probe and board
SET POINT 2; point of pressing sample to observing probe by grasping probe to further attenuate amplitude $A_0 > A_1 > A_3 > A_4$ $Hv < \frac{1}{2} Hs$ ated by
SAMPLE MANIPULATING APPARATUS This application claims priority under 35 U.S.C. §119 to Japanese Patent Application No. JP2007-146734 filed Jun. 1, 2007, the entire content of which is hereby incorporated by reference.

BACKGROUND OF THE INVENTION

1. Field of the Invention

The present invention relates to a sample manipulating apparatus for observing a sample (manipulation object) placed on a surface of a substrate, thereafter, manipulating the sample based on an observation data.

2. Description of the Related Art

There is known a scanning probe microscope (SPM) of an atomic force microscope (AFM), a scanning tunneling microscope (STM) or the like for measuring various kinds of samples of an electronic material, an organic material or the like at a small region, observing surface shapes of the samples and measuring physical property information. The scanning probe microscope is accurate also as a three-dimensional positioning mechanism, and therefore, various proposals have been made for applying the scanning probe microscope as a working apparatus of working a small region.

There has already been developed a working apparatus referred to as an AFM tweezers for positioning a sample between two pieces of probes and grasping or releasing the sample as an application to manipulation of the sample using a scanning probe microscope.

There is known one of AFM tweezers of this kind utilizing a cantilever used in a scanning probe microscope or the like. For example, there is known an AFM tweezers attaching two pieces of carbon nanotubes onto a stylus provided at a front end of a cantilever comprising silicon. Further, there is also known other AFM tweezers attaching two pieces of carbon nanotubes to a glass tube as a cantilever, as well as an AFM tweezers fabricating two pieces of cantilevers by using an MEMS (Micro Electro Mechanical System) process from a silicon substrate or the like.

Among them, in the case of the AFM tweezers having two pieces of carbon nanotubes, two pieces of the carbon nanotubes are opened and closed normally by applying static electricity between two pieces of the carbon nanotubes. On the other hand, in the case of the AFM tweezers fabricating two pieces of the cantilevers by the MEMS process, two piece of the cantilevers are opened and closed by utilizing an electrostatic actuator in a comb teeth-like shape, or two pieces of the cantilevers are opened and closed by enlarging linear expansion of silicon by generating heat by making a current flow to roots of the cantilevers (Transaction of the Institute of Electrical Engineers of Japan, E 2005; Vol 125-No. 11, "Development of AFM tweezers for manipulating nano substance" TAKEGAWA et al) Nonpatent Reference 1).

However, according to the above-described AFM tweezers, the following problem still remains.

Generally, when a sample is grabbed by an AFM tweezers, there is frequently a case in which a hardness, a size or the like of the sample to be grasped has not been found beforehand. However, according to any of the above-described AFM tweezers, the sample is grasped or released simply by opening or closing the carbon nanotubes or the cantilevers, and therefore, it is difficult to carry out manipulation in correspondence with the hardness or the size of the sample.

Therefore, in a case of a soft sample, the sample is frequently deformed or crashed to destruction by a grasping force of the tweezers. Further, in a case of a hard sample, there is a case in which the sample is flipped to move to another location. Particularly, in a case of a strong grasping force, the movement is significant. Further, when a grasping position is not pertinent, there is a case that the sample is moved to another location. When the sample is moved in this way, it is necessary to position tweezers and a sample again, and therefore, an efficient operation cannot be carried out.

Furthermore, even when the sample can presumably be grasped and moved to a predetermined location, in detaching the AFM tweezers from the sample, there is a possibility of adhering the sample thereto; and therefore, it is difficult to detect whether the carbon nanotube or the cantilever and the sample are firmly detached and the detachment has correctly been finished.

SUMMARY OF THE INVENTION

The invention has been carried out in consideration of such a situation and it is a principal object thereof to provide a sample manipulating apparatus capable of firmly and swiftly grasping a sample mounted on a substrate and capable of detecting with high accuracy whether the grasping has been finished.

Further, it is other object thereof to provide a sample manipulating apparatus capable of adjusting a grasping force in accordance with a sample and capable of detecting with high accuracy whether detachment of the sample has been finished after the grasping has been finished.

In order to achieve the object, the invention provides a following means.

According to the invention, there is provided a sample manipulating apparatus which is a sample manipulating apparatus for manipulating a sample mounted on a surface of a substrate, the sample manipulating apparatus comprising a stage for fixing the substrate, tweezers comprising an observing probe and a grasping probe contiguously arranged in a state of being spaced apart from each other by a predetermined gap and respectively having styluses arranged opposedly to each other at the surface of the substrate at front ends thereof, moving means for moving the substrate and the tweezers relatively in a direction parallel with the surface of the substrate and a direction orthogonal to the surface of the substrate, oscillating means for oscillating the observing probe by a predetermined frequency and a predetermined amplitude, displacement measuring means for measuring a displacement of the observing probe, probe driving means for moving the grasping probe to a side of the observing probe to make the two probes proximate to each other more than the predetermined gap, and controlling means for controlling the moving means, the oscillating means and the probe driving means, wherein the controlling means acquires at least position data and shape data of the sample by observing the sample by an AFM observation of oscillation of the observing probe, thereafter, positions the tweezers by the moving means such that the sample is positioned between the observing probe and the grasping probe based on the two set of data, after positioning, sets a height of the tweezers at a position of being remote from the surface of the substrate by a constant distance by the moving means while monitoring a result of measurement by the displacement measuring means, thereafter, moves the grasping probe to the side of the observing probe by the probe driving means while monitoring the result of measurement by the displacement measuring means at the set height and causes the sample to be grasped while detecting a grasping start point.

In the sample manipulating apparatus according to the invention, first, the AFM observation on the substrate surface is carried out by moving the tweezers and the substrate relative to each other by the moving means while oscillating the observing probe by the oscillating means. Specifically, the observation is carried out while controlling a distance between the tweezers and the substrate surface in the height such that an oscillation state of the observing probe becomes constant (that is, an attenuating amount from a free oscillating amplitude becomes constant or a frequency shift amount from a free oscillation frequency becomes constant, or a phase shift amount from a free oscillation phase becomes constant). Thereby, at least the position data and the shape data of the sample can be acquired, and it can be grasped at what location on the substrate the sample is mounted, and by what shape (height, outer shape or the like) the sample is constituted.

Further, after finishing the observation, the oscillation of the observing probe may be stopped, or the observing probe may be brought into the oscillation state successively.

Successively, the tweezers are positioned by the moving means based on the acquired position data and the acquired shape data such that the sample is disposed between the observing probe and the grasping probe. Particularly, it has already been grasped at what location on the substrate the sample is mounted, and therefore, the tweezers can swiftly be positioned.

Successively, the tweezers and the substrate are made to be proximate to each other by the moving means from the positioned position and the tweezers are set in the height at a position remote from the substrate surface by a constant distance. At this occasion, a result of measurement of the displacement measuring means is monitored, and therefore, the tweezers can be positioned at a desired height based on the displacement of the observing probe. Thereby, the stylus of the observing probe and the stylus of the grasping probe are brought into a state of being positioned on both sides of the sample by interposing the sample therebetween.

Successively, the grasping probe is moved to the side of the observing probe by the probe driving means and the two probes are made to be proximate to each other more than the predetermined gap. Then, the stylus of the grasping probe becomes proximate to the sample, thereafter, brought into contact with the sample and start pressing the sample to the observing probe. Further, the sample can be grasped by the two probes by bringing the sample into contact with the stylus of the observing probe.

During a time period of carrying out the grasping, the result of measurement by the displacement measuring means is monitored, and therefore, it can immediately be detected that the sample is brought into contact with the observing probe, that is, the grasping start point. Therefore, it can detected with high accuracy whether the grasping the sample has been finished. Further, the tweezers are positioned in accordance with the shape of the sample, and therefore, an optimum position can be grasped and a possibility that the sample is moved by grasping an impertinent position as in the related art can be made to be as less as possible. Therefore, the sample can firmly be grasped.

As described above, according to the sample manipulating apparatus according to the invention, the sample mounted on the substrate can firmly and swiftly be grasped and it can be detected with high accuracy whether the grasping has been finished. Therefore, the manipulation operation can efficiently be carried out.

Further, according to the sample manipulating apparatus according to the invention, the controlling means makes the tweezers and the substrate proximate to each other in an oscillation state of the observing probe by the predetermined frequency and the predetermined amplitude by the oscillating means after finishing positioning, sets the height when the amplitude of the observing probe is attenuated by being brought into contact with the substrate to reach a first attenuated value smaller than the predetermined amplitude by a previously determined amount, and detects the grasping start point when the amplitude is further attenuated by pressing the sample to the observing probe to reach a second attenuated value smaller than the first attenuated value by a previously determined amount.

According to the sample manipulating apparatus according to the invention, after the observation has been finished, the observing probe is successively oscillated, and the sample is grasped under the state. That is, in an oscillation state of the observing probe by the predetermined frequency and the predetermined amplitude successively after finishing the observation, the tweezers are positioned and the height is set. When the height is set, first, the tweezers and the substrate are made to be proximate to each other at the positioned position. Then, the amplitude of the observing probe is started to attenuate gradually by an atomic force exerted between the stylus of the observing probe and the substrate. Further, when the stylus of the observing probe and the substrate are brought into contact with each other by further making the tweezers proximate to the substrate, the amplitude is further attenuated, and reaches the first attenuated value smaller than an initial amplitude, that is, the predetermined amplitude by the previously determined amount. At this occasion, the height is set. Thereby, the oscillating observing probe can firmly be positioned at a desired height.

Further, when the sample is grasped between the observing probe and the grasping probe, the observing probe is pressed by the sample, and therefore, the oscillation of the observing probe is hampered and the amplitude is further attenuated. Hence, it is determined that the grasping is carried out when the oscillation of the observing probe reaches the second attenuated value smaller than the first attenuated value by the previously determined amount. That is, the time point constitutes the grasping start point. In this way, by constituting an index by the amount of attenuating the amplitude, the height of setting or grasping of the tweezers can firmly be carried out.

Further, according to the sample manipulating apparatus according to the invention, the controlling means makes the amplitude of the observing probe reset an amplitude of oscillation of observing probe in a noncontact state relative to the surface of the substrate after setting the height at the position.

According to the sample manipulating apparatus according to the invention, after setting the height, the amplitude of the observing probe oscillating by the amplitude of the first attenuated value is reset to the amplitude of making the observing probe noncontact with the substrate surface. That is, at a time point of setting the height, the observing probe is brought into the state of being oscillated by the first attenuated value while being periodically brought into contact with the substrate surface. However, by resetting the amplitude as described above, after the height is set, the observing probe can be oscillated without being brought into contact with the substrate surface. Therefore, the index can be constituted only by the attenuated value by grasping the sample by disregarding a change in the amplitude owing to contact with the substrate surface, and therefore, it can be detected that the sample is grasped with higher accuracy.

Further, according to the sample manipulating apparatus according to the invention, in setting the height, the first attenuated value is set such that the constant distance becomes equal to or smaller than ½ of the height of the sample.

According to the sample manipulating apparatus according to the invention, the interval between the styluses of the two probes and the substrate surface are set to be equal to or smaller than ½ of the height of the sample, and therefore, when the sample is grasped, contact areas of the styluses of the two probes and the sample can be ensured as much as possible. Therefore, the sample can further stably be grasped, and the manipulation operation can stably be carried out.

Further, according to the sample manipulating apparatus according to the invention, the controlling means makes the tweezers and the substrate proximate to each other in a state of stopping the oscillating means after finishing the positioning, sets the height when flexing of the observing probe reaches a previously determined rectified value, and detects the grasping start point when the twisting of the observing probe is measured by pressing the sample to the observing probe.

According to the sample manipulating apparatus according to the invention, after the observation has been finished, the sample is grasped in the state of stopping oscillation of the observing probe. That is, after finishing the observation, in the state of stopping the oscillation of the observing probe, the tweezers are positioned and the height is set. When the height is set, first, the tweezers and the substrate are made to be proximate to each other at the positioned position. Then, the observing probe is gradually flexed by the atomic force exerted between the stylus of the observing probe and the substrate. Further, the height is set when the flexing of the observing probe reaches the previously determined rectified value. Thereby, the observing probe can firmly be positioned to a desired height.

Further, when the sample is grasped between the observing probe and the grasping probe, the observing probe is pressed by the sample, and therefore, twist is produced at the observing probe. Hence, it is determined that the grasping is carried out when the twist of the observing probe is measured. That is, the time point constitutes the grasping start point. In this way, even in a state of stopping the oscillation of the observing probe, the height setting or grasping of the tweezers can firmly be carried out. Particularly, since the oscillation of the observing probe is stopped, even a hard sample or a sample having a large size (for example, 1 μm or more) can stably be grasped.

Further, according to the sample manipulating apparatus according to the invention, the controlling means temporarily brings the tweezers and the substrate into contact with each other when the height is set, thereafter, sets the height by making the tweezers and the substrate remote from each other until the flexing of the observing probe reaches the rectified value.

According to the sample manipulating apparatus according to the invention, when the height of the tweezers is set, the height is set by carrying out the pull up (detach) operation after the tweezers are temporarily brought into contact with the substrate, and therefore, the height can further accurately be set based on flexing of the observing probe.

Further, according to the sample manipulating apparatus according to the invention, in setting the height, the rectified value is set such that the constant distance becomes equal to or smaller than ½ of the height of the sample.

According to the sample manipulating apparatus according to the invention, the intervals between the styluses of the two probes and the substrate surface are set to be equal to or smaller than ½ of the height of the sample, and therefore, when the sample is grasped, the contact areas of the styluses of the probe and the sample can be ensured as much as possible. Therefore, the sample can further stably be grasped and the manipulation operation can stably be carried out.

Further, according to the sample manipulating apparatus according to the invention, the controlling means adjusts a grasping force by further moving the grasping probe to the side of the observing probe from the grasping start point in accordance with a physical property of the sample.

According to the sample manipulating apparatus according to the invention, the grasping force is adjusted in accordance with the physical property of the sample, and therefore, the sample can firmly be grasped without deforming, crushing, flipping the sample to thrust to other location. The manipulation operation can stably be carried out.

Further, according to the sample manipulating apparatus according to the invention, the controlling means calculates a size of the sample from the predetermined gap and a moving distance of moving the grasping probe from an initial position to the grasping start point.

According to the sample manipulating apparatus according to the invention, the size of the sample can be calculated by subtracting the moving distance of moving the grasping probe from the initial position to the grasping start point from the predetermined gap constituting the initial interval between the observing probe and the grasping probe, that is, the previously known interval. In this way, the sample can be grasped while calculating the size of the sample.

Further, according to the sample manipulating apparatus according to the invention, the controlling means moves the grasping probe in a direction of being remote from the observing probe to return to the initial position after finishing to grasp the sample and makes the tweezers remote from the surface of the substrate, and thereafter, oscillates the observing probe and detects whether the sample is detached by comparing an oscillation state at this occasion and the oscillation state before grasping the sample.

According to the sample manipulating apparatus according to the invention, after grasping of the sample has been finished, the grasping probe is returned to the initial position to release the sample from being grasped and the tweezers are made to be sufficiently remote from the substrate surface. Further, the observing probe is oscillated again. At this occasion, when the sample is not adhered to the stylus of the grasping probe and the sample is detached, the observing probe is oscillated in the oscillation state before being grasped. On the other hand, when the sample is adhered to the stylus of the observing probe, the oscillation state of the observing probe carries out an oscillation different from that of the oscillation state before being grasped.

Therefore, it can be detected whether detachment of the sample has been finished by comparing with the oscillation state before being grasped, and a reliability of the manipulation operation can thereby be promoted.

Further, according to the sample manipulating apparatus according to the invention, the controlling means detects whether the sample is detached by moving the grasping probe again to the side of the observing probe after the grasping start point is reached again after comparing the oscillation states.

According to the sample manipulating apparatus according to the invention, after comparing the oscillation states, the grasping probe returned to the initial position is moved again to the grasping start point. Here, when grasping of the sample is released, in a case in which the sample is adhered not to the side of the observing probe but to the side of the stylus of the grasping probe, when the grasping probe is returned to the grasping start point, the sample is grasped again, and therefore, the observing probe is displaced. On the other hand, when the sample is not adhered to the grasping probe, the observing probe is not displaced at all. Therefore, by returning the grasping probe again to the grasping start point, it can be confirmed that the sample is not adhered not only to the observing probe but to the side of the grasping probe and it can be detected whether the detachment has been finished with higher accuracy.

Further, according to the sample manipulating apparatus according to the invention, it is detected whether the sample is detached by detecting the oscillation state of the observing probe by the displacement detecting means when the grasping probe is moved to reach again the grasping start point. According to the sample manipulating apparatus, it can be detected whether the sample is adhered to the grasping probe by detecting the oscillation state of the observing probe as described above.

According to the sample manipulating apparatus according to the invention, when the grasping probe is returned to the grasping start point, in a case in which the sample is not adhered to the grasping probe, the observing probe is not displaced at all, and therefore, the oscillation state remains unchanged. On the other hand, when the sample is adhered to the grasping probe, the oscillation state of the observing probe is changed. Therefore, by detecting the oscillation state of the observing probe, it can be detected with high accuracy whether the sample is adhered to the grasping probe.

According to the sample manipulating apparatus according to the invention, the sample mounted on the substrate can firmly and swiftly be grasped and it can be detected with high accuracy whether the grasping has been finished. Therefore, the manipulation operation can efficiently be carried out. Further, the grasping force can be adjusted in accordance with the sample and it can be detected with high accuracy whether the detachment of the sample has been finished after finishing to grasp the sample.

BRIEF DESCRIPTION OF THE DRAWINGS

FIG. 3A is a view showing a state of positioning tweezers, FIG. 3B is a view showing a state of setting a height of the tweezers to a height of being remote from a surface of a substrate by a constant distance, FIG. 3C is a view showing a state of moving a grasping probe to be brought into contact with a sample, and FIG. 3D is a view showing a state of moving a grasping probe and grasping the sample between the grasping probe and the observing probe;

FIG. 5A is a view showing a state of positioning the tweezers, FIG. 5B is a view showing a state of setting the height of the tweezers to the height of being remote from the surface of the substrate by the constant distance, FIG. 5C is a view showing a state of setting again the amplitude such that the observing probe is not brought into contact with the sample, FIG. 5D is a view showing a state of moving the grasping probe to be brought into contact with the sample, and FIG. 5E is a view showing a state of moving the grasping probe further to grasp the sample between the grasping probe and the observing probe;

FIG. 6A is a view showing a state of bringing the tweezers into contact with the surface of the substrate, FIG. 6B is a view showing a state of setting the height of the tweezers to the height of being remote from the surface of the substrate by the constant distance, FIG. 6C is a view showing a state of moving the grasping probe to be brought into contact with the sample, and FIG. 6D is a view showing a state of moving the grasping probe further and grasping the sample between the grasping probe and the observing probe;

DETAILED DESCRIPTION OF THE PREFERRED EMBODIMENTS

An embodiment of a sample manipulating apparatus according to the invention will be explained in reference to FIG. 1 through FIG. 8 as follows. Further, according to the embodiment, an explanation will be given by taking an example of a case of utilizing an optical lever system.

Figure 1:
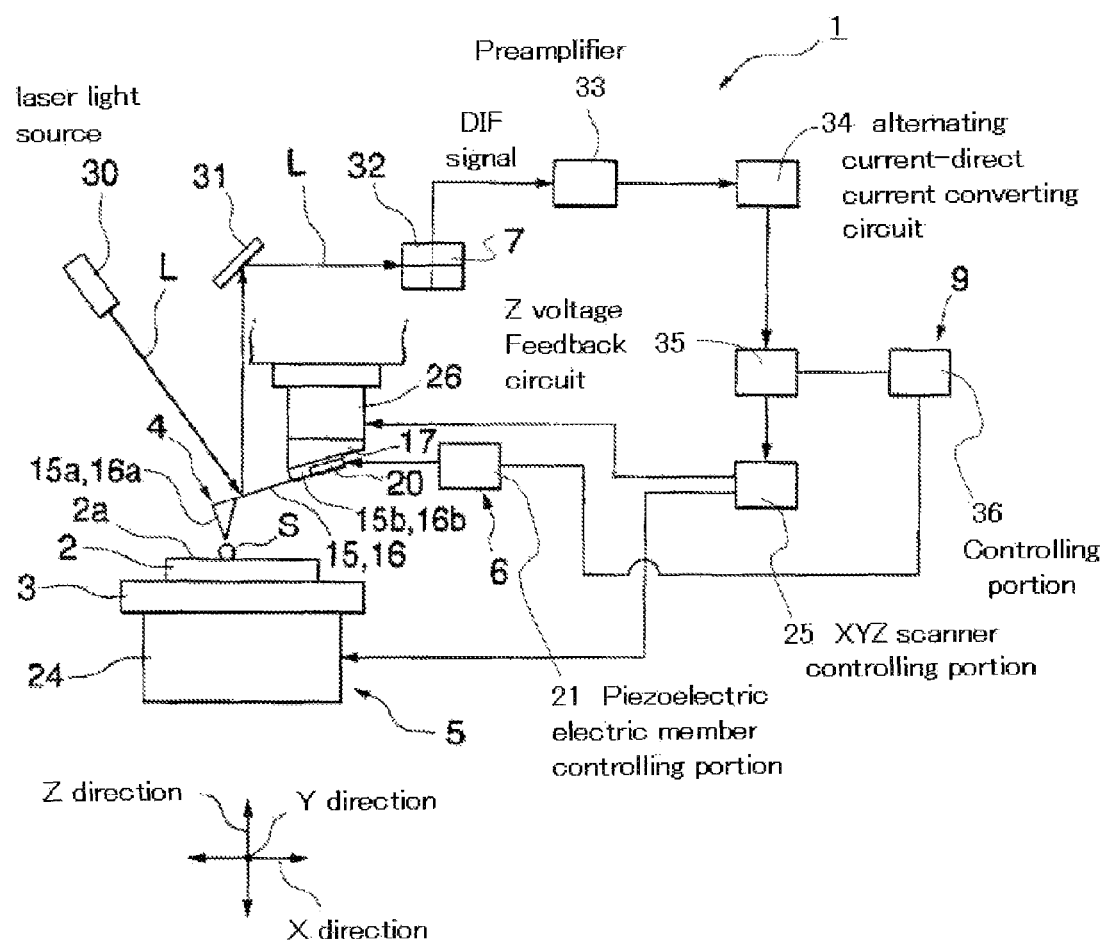
FIG. 1 is a constitution view of an embodiment of a sample manipulating apparatus according to the invention.
Figure 2:
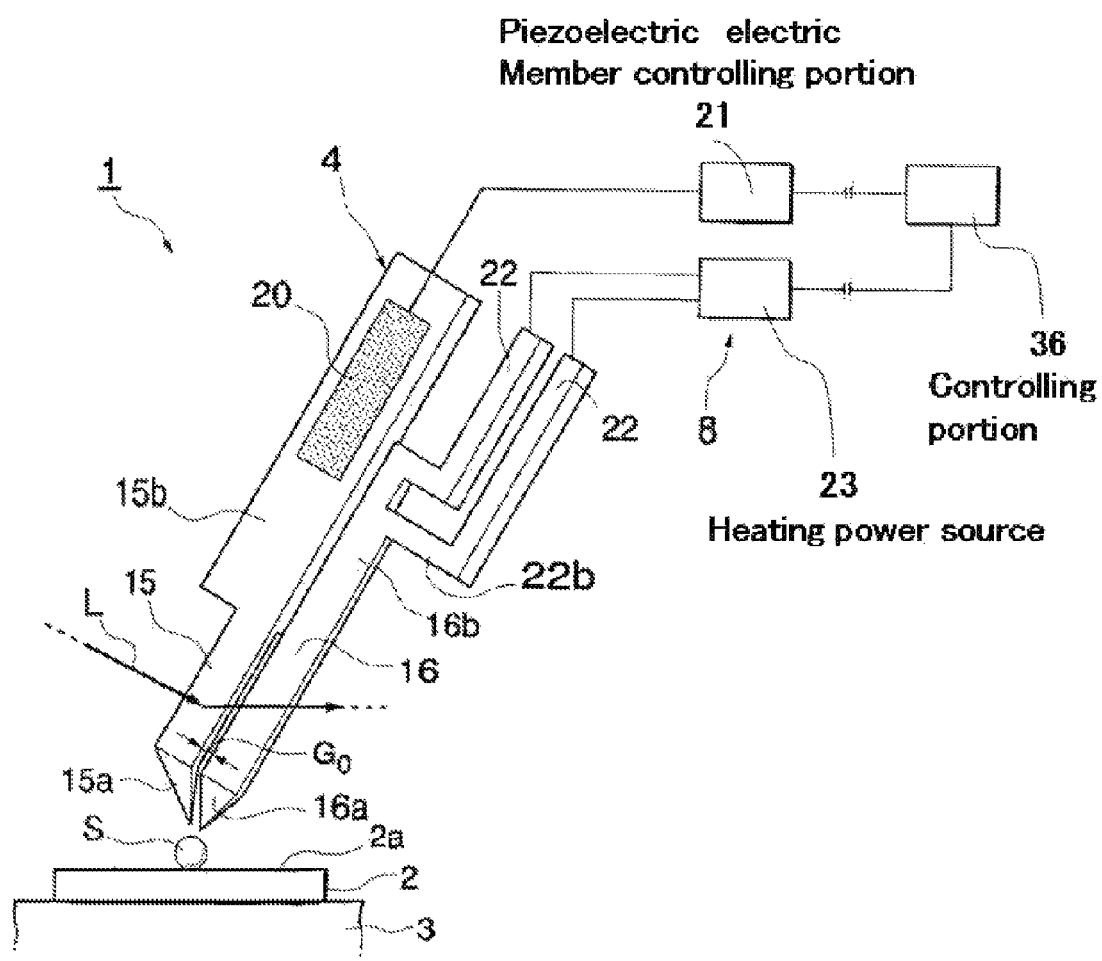
FIG. 2 is a perspective view of tweezers which is a product constituting the sample manipulating apparatus shown in FIG. 1.
Figure 3:
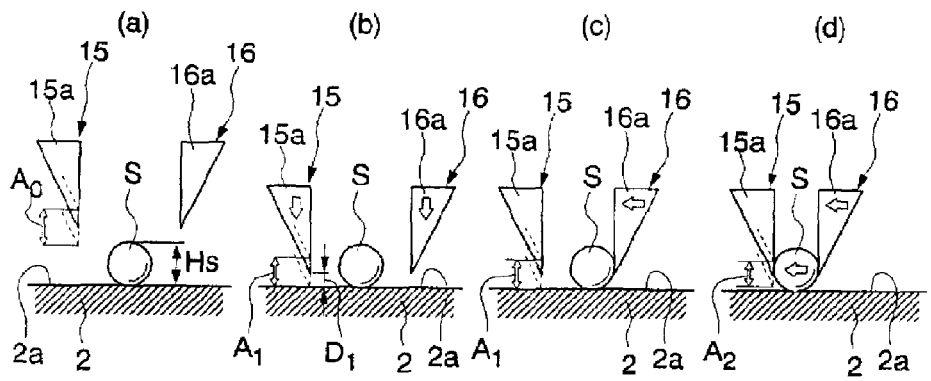
FIGS. 3A, 3B, 3C and 3D are step views when the sample is manipulated while oscillating an observing probe of the sample manipulating apparatus shown in FIG. 1.

A sample manipulating apparatus 1 of the embodiment is an apparatus of manipulating a sample S mounted onto a substrate surface 2a and includes a sample base (stage) 3, tweezers 4, moving means 5, oscillating means 6, displacement measuring means 7, probe driving means 8 and controlling means 9 as shown in FIGS. 1 and 2.

A substrate 2, mounted with the sample S constituting a manipulation object, is fixed onto the sample base 3. The tweezers 4 are constituted by an observing probe 15, and a grasping probe 16 arranged contiguously to each other in a state of being spaced apart from each other by a predetermined gap ($G_0$) and respectively having styluses 15a and 16a arranged to be opposed to the substrate surface 2a at front ends thereof. The two probes 15 and 16 are formed by silicon and are supported in a cantilever state respectively by main body portions 15b and 16b fixed to a holder portion 17.

Further, according to the embodiment, the observing probe 15 and the grasping probe 16 are brought into a state of being spaced apart from each other by an interval of 4 µm previously at an initial stage. That is, the predetermined gap ($G_0$) is made to be 4 µm.

The observing probe 15 is fixed with a piezoelectric member 20 for oscillating the observing probe 15. The piezoelectric member 20 is made to be oscillated by a predetermined frequency ($f_0$) and a predetermined amplitude ($A_0$) by receiving a signal from a piezoelectric member control portion 21 and the oscillation is transmitted to the observing probe 15. Thereby, the observing probe 15 is made to be oscillated by the predetermined frequency ($f_0$) and the predetermined amplitude ($A_0$) similar to the piezoelectric member 20. That is, the piezoelectric member 20 and the piezoelectric member control portion 21 function as the oscillating means 6.

A base end side (root side) of the grasping probe 16 is bifurcated and the bifurcated portion is made to constitute a heating portion 22 functioning as a thermal actuator. Particularly, a portion 22b of the heating portion 22 is formed by a shape thinner than the other portion to be able to make the grasping probe 16 proximate to a side of the observing probe 15 by linear expansion by electrical conductive heating. Further, the heating portion 22 is connected to a heating power source 23 and the electrical conductive heating is controlled by the heating power source 23. That is, the heating portion 22 and the heating power source 23 function as the probe driving means 8 by making the two probes 15 and 16 more proximate than the predetermined gap ($G_0$) by moving the grasping probe 16 to the side of the observing probe 15.

Further, according to the embodiment, lengths of the observing probe 15 and the grasping probe 16 differ from each other to set resonance frequencies thereof to differ from each other. However, the resonance frequencies of the two probes 15 and 16 may be constituted to differ from each other by changing not the lengths, but the widths, thicknesses or the like thereof. Further, the observing probe 15 and the grasping probe 16 are respectively insulated from each other electrically and are brought into floating states such that potentials thereof can be set separately from each other. Ordinarily, they are in the state having the same potential (earth potential) as that of the sample base 3.

The sample base 3 is mounted onto an XY scanner 24, and the XY scanner 24 is mounted onto an oscillation isolating base, not illustrated. The XY scanner 24 is, for example, a piezoelectric element and is made to move by a small amount in XY directions in parallel with the substrate surface 2a by being applied with a voltage from an XYZ scanner controlling portion 25 including an XY scanning system and a Z servo system. Thereby, the substrate 2 and the sample S are made to be able to be moved by a small amount in XY directions.

Further, the holder portion 17 is fixed to be hung from a Z scanner 26. The Z scanner 26 is, for example, a piezoelectric element similar to the XY scanner 24 and is made to be moved by a small amount in Z direction orthogonal to the substrate surface 2a by being applied with a voltage from the XYZ scanner controlling portion 25. Thereby, the tweezers 4 are made to be able to be moved by a small amount in Z direction.

That is, the XY scanner 24, the Z scanner 26 and the XYZ scanner controlling portion 25 function as the moving means 5 for moving the substrate 2 and the tweezers 4 relatively in three-dimensional directions of XY directions in parallel with the substrate surface 2a and Z direction orthogonal to the substrate surface 2a.

Further, a laser light source 30 for irradiating laser light L to a reflecting face, not illustrated, formed on a back face side of the observing probe 15, and a light detecting portion 32 for receiving the laser light L reflected by the reflecting face by utilizing a mirror 31 are provided above the sample base 3. The light detecting portion 32 is, for example, a photodiode an incidence face of which is divided into two or divided into four for detecting an oscillation state of the observing probe 15 from an incidence position of the laser light L. Further, the light detecting portion 32 outputs a detected displacement of an oscillation state of the observing probe 15 to a preamplifier 33 as a DIF signal. That is, the laser light source 30, the mirror 31, and the light detecting portion 32 are made to function as the displacement measuring means 7 for measuring the displacement of the observing probe 15.

Further, the DIF signal outputted from the light detecting portion 32 is amplified by the preamplifier 33, thereafter, transmitted to an alternating current-direct current converting circuit 34 to be converted into a direct current and is transmitted to a Z voltage feedback circuit 35. The Z voltage feedback circuit 35 controls the XYZ scanner controlling portion 25 by a feedback control such that the DIF signal converted into the direct current becomes always constant. Thereby, when the sample S is observed, a distance between the substrate 2 and the tweezers 4 can be controlled such that the oscillation state of the observing probe 15 becomes constant, specifically, an amount of attenuating the amplitude or an amount of shifting the frequency, or an amount of shifting a phase becomes constant.

Further, a controlling portion 36 is connected to the Z voltage feedback circuit 35 and the controlling portion 36 is made to be able to acquire an observation data on the substrate surface 2a based on a signal of moving up and down by the Z voltage feedback circuit 35. Thereby, at least a position data or a shape data of the sample S is made to be able to acquire. The Z voltage feedback circuit 35 and the controlling portion 36 function as the controlling means 9. Further, the controlling means 9 generally controls the above-described respective constituent products to control to manipulate (operate) the sample S after observing the sample S.

Next, an explanation will be given as follows of a case of observing the sample S on the substrate surface 2a, thereafter, manipulating the sample S by the sample manipulating apparatus 1 constituted in this way.

First, in manipulating the sample S, the controlling means 9 is set to control the respective constituent products to carry out an acquiring step, a positioning step, a height setting step, a grasping step, and a detaching step.

The acquiring step is a step of acquiring at least a position data and a shape data of the sample S by observing the sample S by AFM observation of oscillation of the observing probe 15. The positioning step is a step of positioning the tweezers 4 by the moving means 5 such that that the sample S is positioned between the observing probe 15 and the grasping probe 16 based on the acquired data. The height setting step is a height step of setting a height of the tweezers 4 at a position of being remote from the substrate surface 2a by a constant distance ($D_1$) by the moving means 5 while monitoring a result of measurement by the displacement measuring means 7. The grasping step is a step of grasping the sample S while detecting a grasping start point by moving the grasping probe 16 to a side of the observing probe 15 by the probe driving means 8 while monitoring the result of measurement by the displacement measuring means 7 at the set height. The detaching step is a step of detaching the sample S from the tweezers 4 by releasing the grasped sample S.

The respective steps will be explained in details as follows. Further, according to the embodiment, an explanation will be given by taking an example of a case of grasping the sample S in an oscillation state of the observing probe 15.

First, initial setting is carried out. That is, positions of the laser light source 30 and the light detecting portion 32 are adjusted such that the laser light L is firmly incident on the reflecting face of the observing probe 15 and the reflected laser light L is firmly incident on the light detecting portion 32. Further, the piezoelectric member 20 is oscillated by the predetermined frequency (f0) and the predetermined amplitude (A0) by outputting a signal from the piezoelectric electric member controlling portion 21 to the piezoelectric member 20. Thereby, the observing probe 15 is oscillated by the predetermined frequency ($f_0$) and the predetermined amplitude ($A_0$).

After finishing the initial setting, AFM observation of the samples S is carried out. Here, an explanation will be given by taking an example of an oscillation amplitude control.

Specifically, the substrate surface 2a is scanned by the XY scanner 24 in a state of controlling the distance between the tweezers 4 and the substrate surface 2a in the height such that an oscillation state of the observing probe 15 is constant while oscillating the observing probe 15. At this occasion, the amplitude of the observing probe 15 is going to be increased or reduced in accordance with recesses and projections of the substrate surface 2a, and therefore, the amplitude of the laser light L (laser light reflected by the reflecting face) incident on the light detecting portion 32 differs. The light detecting portion 32 outputs the DIF signal in accordance with the amplitude to the preamplifier 33. The outputted DIF signal is amplified by the preamplifier 33 and converted into a direct current by the alternating current-direct current converting circuit 34, thereafter, transmitted to the Z voltage feedback circuit 35.

The Z voltage feedback circuit 35 carries out the feedback control by moving the Z scanner 26 by a small amount in Z direction by the XYZ scanner controlling portion 25 such that the DIF signal converted into the direct current becomes always constant (that is, such that the amplitude of the observing probe 15 becomes constant). Thereby, the substrate surface 2a can be scanned in a state of controlling the distance between the substrate surface 2a and the tweezers 4 in the height such that the oscillation state of the observing probe 15 becomes constant. Further, the controlling portion 36 can acquire an observation data on the substrate surface 2a based on a signal moved up and down by the Z voltage feedback circuit 35. As a result, the position data and the shape data of the sample S mounted onto the substrate surface 2a can be acquired, and it can be grasped at which portion of the substrate 2 the sample S is mounted and by what shape the sample S is constituted. As a result, a height (Hs) of the sample S can be confirmed beforehand.

Successively, the oscillation of the observing probe 15 is temporarily stopped and the tweezers 4 are positioned by the XY scanner 24 such that the sample S is positioned between the observing probe 15 and the grasping probe 16 based on the acquired position data and the acquired shape data. Particularly, it is already grasped at which portion on the substrate 2 the sample S is mounted, and therefore, the tweezers 4 can swiftly be positioned. In the positioning, the tweezers 4 are made to be sufficiently remote from the substrate surface 2a.

Successively, the tweezers 4 and the substrate 2 are made to be proximate to each other from the positioned position by the moving means 5 and the height of the tweezers 4 is set at a position of being remote from the substrate surface 2a by a constant distance ($D_1$). Explaining in details, as shown by FIG. 3A, first, the observing probe 15 is oscillated (self-excited resonance oscillation) by the predetermined frequency ($f_0$) and the predetermined amplitude ($A_0$) at the positioned position. Further, the piezoelectric member controlling portion 21 is adjusted such that the predetermined amplitude ($A_0$) at this occasion becomes equal to or smaller than ½ of the height (Hs) of the sample S. Further, the predetermined frequency ($f_0$), the predetermined amplitude ($A_0$) and a Q value ($Q_0$) of oscillation at this occasion are recorded as values in free oscillation of the observing probe 15.

Figure 4:
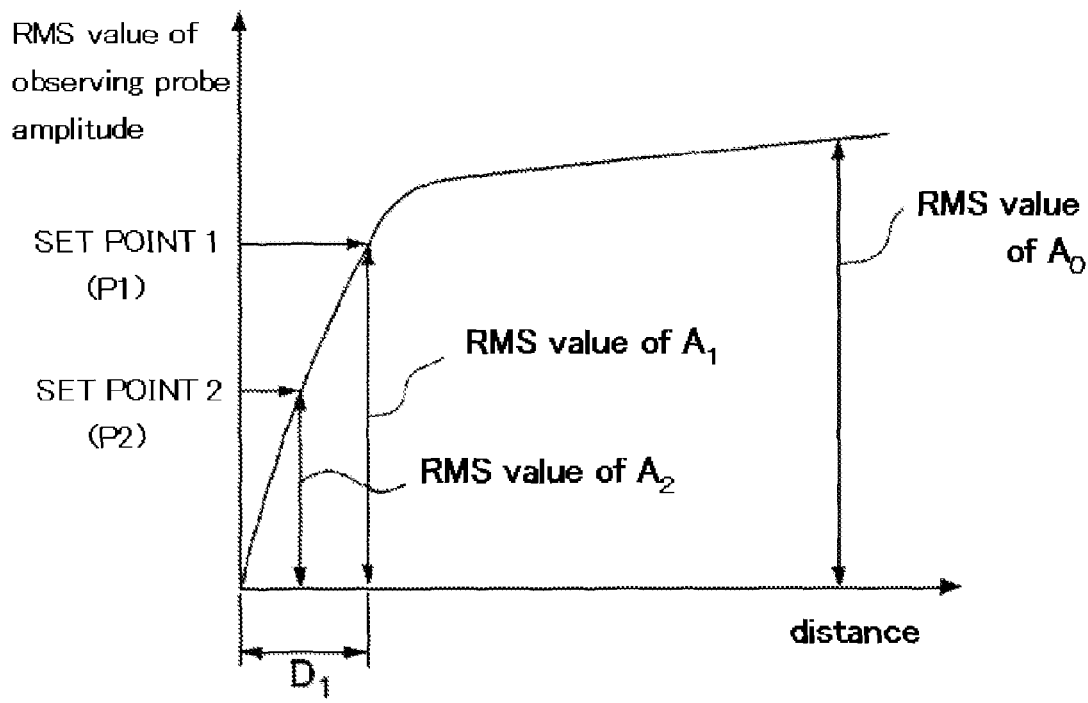
FIG. 4 is a diagram showing a force distance curve showing a relationship between an RMS value of a resonating oscillation amplitude of the observing probe and a distance between the observing probe and the substrate.
Figure 5:
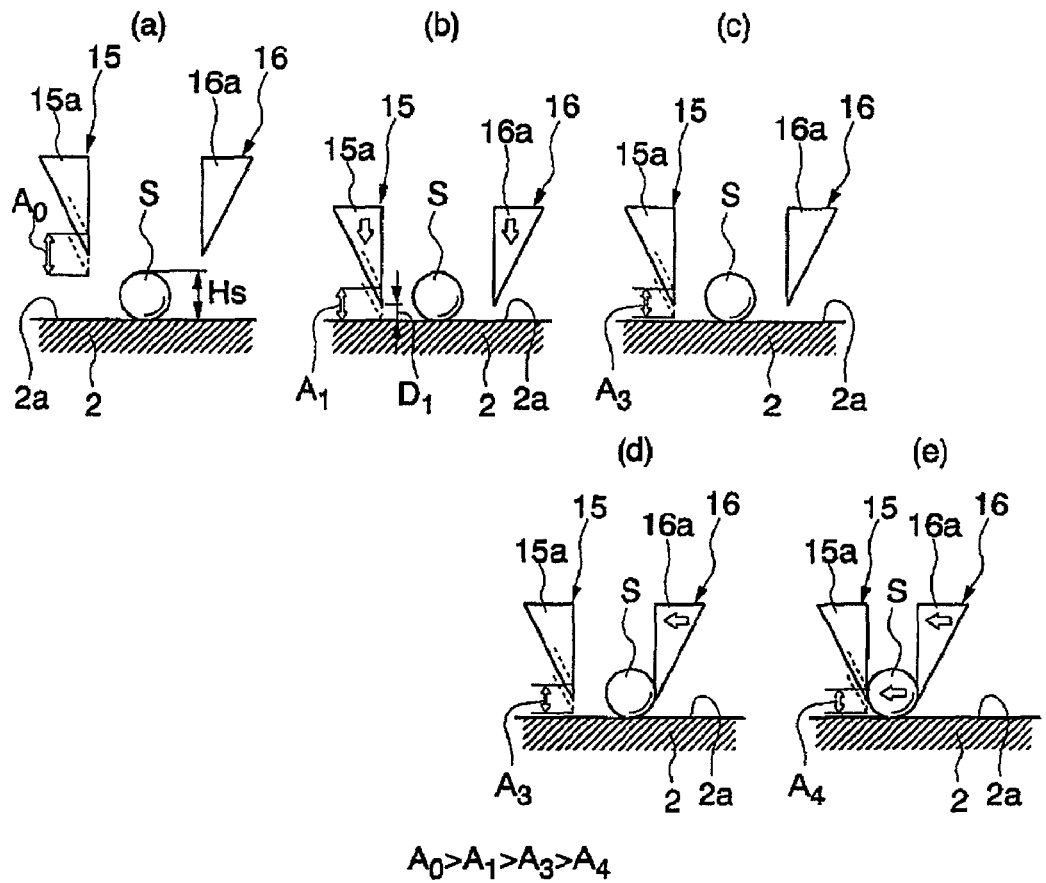
FIGS. 5A, 5B, 5C, 5D and 5E are step views when a sample is manipulated by other method while oscillating the observing probe by the sample manipulating apparatus shown in FIG. 1.
Figure 6:
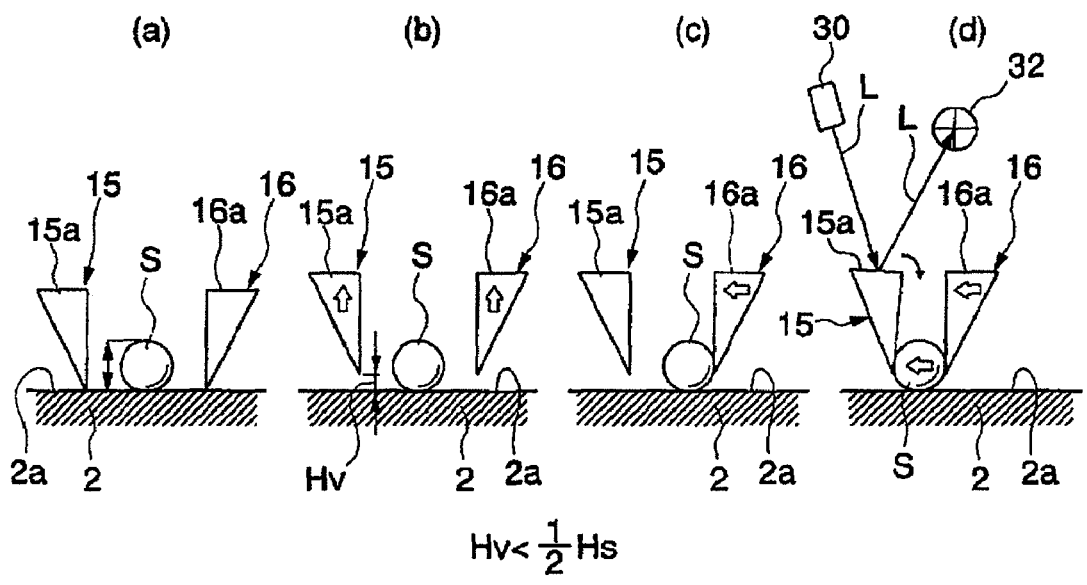
FIGS. 6A, 6B, 6C and 6D are stepped views when the sample is manipulated without oscillating the observing probe by the sample manipulating apparatus shown in FIG. 1.
Figure 7:
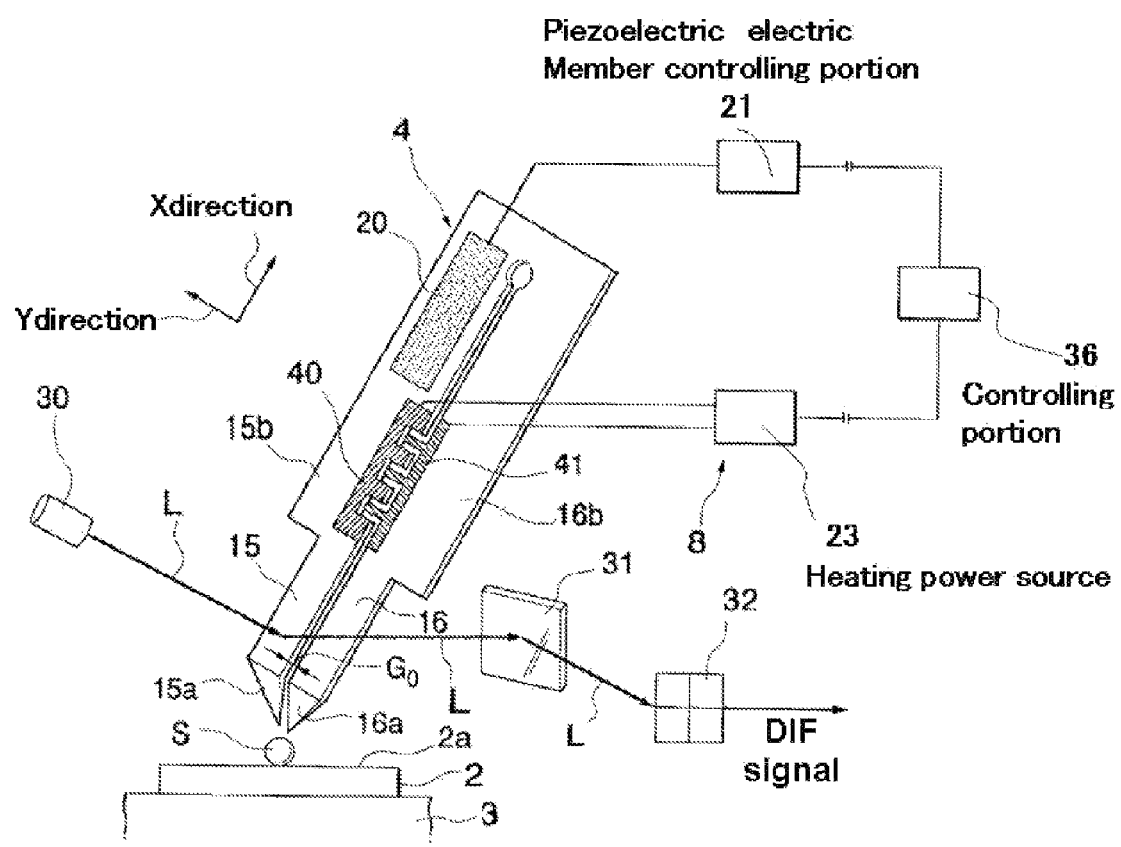
FIG. 7 is a view showing a modified example of the tweezers shown in FIG. 2 and is a perspective view of tweezers for driving a grasping probe by an electrostatic actuator system.
Figure 8:
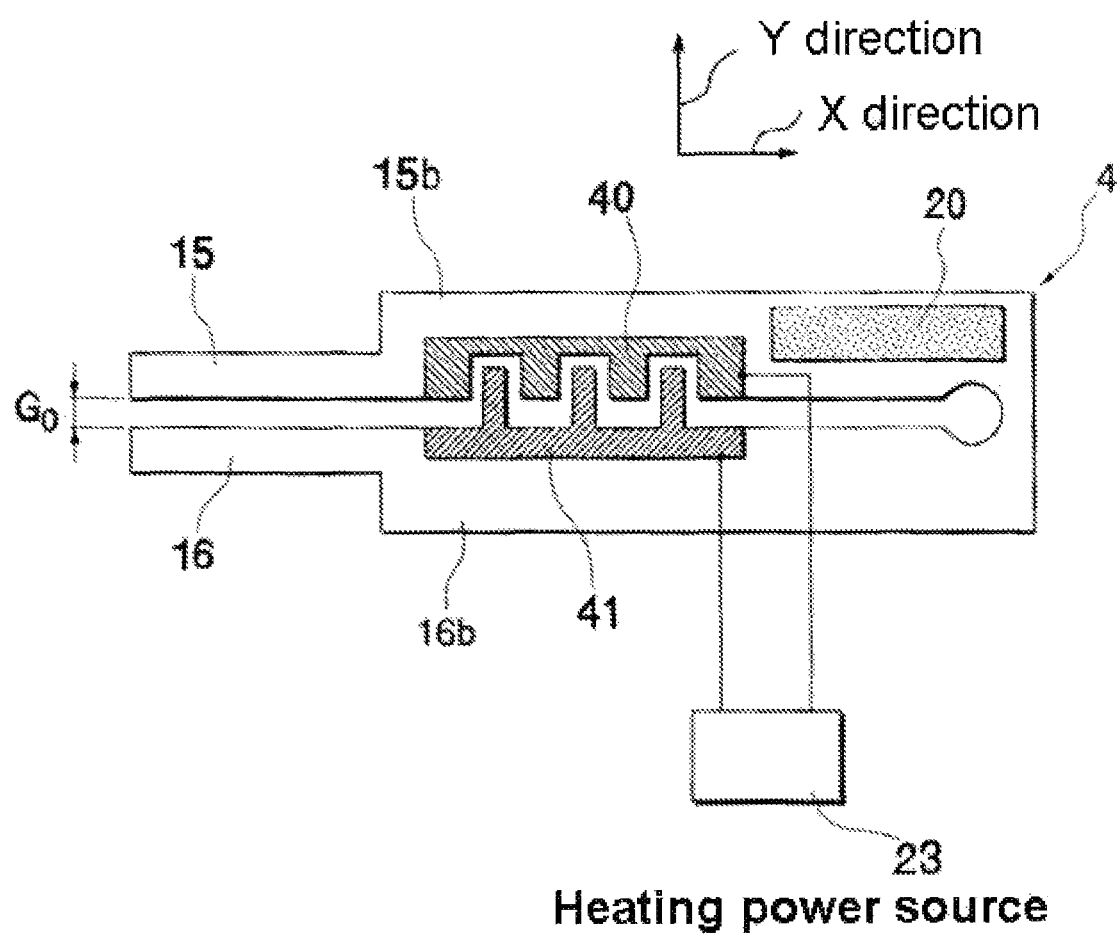
FIG. 8 is a top view of the tweezers shown in FIG. 7.

Here, FIG. 4 shows a force distance curve showing a relationship between an RMS value of a resonance oscillation amplitude of the observing probe 15 and a distance between the observing probe 15 and the substrate 2. It is known that the RMS value becomes small by being influenced by a force exerted between the stylus 15a and the sample S as the observing probe 15 becomes proximate to the substrate 2. Hence, according to the embodiment, a value ($A_1$) smaller than the predetermined amplitude ($f_0$) by a previously determined amount by attenuating the amplitude of the observing probe 15 by contact with the substrate 2 is set as SET POINT 1 (hereinafter, made to be first set point (first attenuated value) P1), and a value (A2) smaller than the first set point P1 by a previously determined amount by further attenuating the amplitude by pressing the grasped sample S to the observing probe 15 is set as SET POINT 2 (hereinafter, made to be second set point (second attenuated value) $P_2$).

After setting the two set points $P_1$ and $P_2$, the substrate 2 and the tweezers 4 are made to be proximate to each other slowly by operating the Z scanner 26 in an oscillation state of the observing probe 15. Then, the amplitude of the observing probe 15 measured by the displacement measuring means 7 becomes gradually small along the force distance curve. Further, as shown by FIG. 3B, at a time point at which the measured amplitude reaches the amplitude ($A_1$) set as the first set point $P_1$, the Z scanner 26 is stopped and the Z servo system is locked. Thereby, the height can be fixed at a position at which the tweezers 4 are remote from the substrate surface 2a by the constant distance ($D_1$) in an oscillation state of the observing probe 15. As a result, the stylus 15a of the observing probe 15 and the stylus 16a of the grasping probe 16 are brought into a state of being positioned on both sides of the sample S by interposing the sample S therebetween.

Further, according to the embodiment, the first set point $P_1$ is set such that the constant distance ($D_1$) becomes equal to or smaller than ½ of the height ($H_s$) of the sample S. Further, when the height is set to the constant distance ($D_1$), the stylus 15a of the observing probe 15 is brought into a state of periodically brought into contact with the substrate surface 2a.

Successively, at the set height, the grasping probe 16 is moved to the side of the observing probe 15 by the probe driving means 8. That is, by heating the heating portion 22 by electricity conduction by the heating power source 23, the grasping probe 16 is moved to the side of the observing probe 15, and the distance between the observing probe 15 and the grasping probe 16 is made to be shorter than the predetermined gap ($G_0$). Then, as shown by FIG. 3C, the stylus 16a of the grasping probe 16 is made to be proximate to the sample S, thereafter, brought into contact with the sample S and starts pressing the sample S to the observing probe 15 as shown by FIG. 3D by further moving the stylus 16a. Further, the sample S can be grasped by the two probes 15 and 16 by bringing the sample S into contact with the stylus 15a of the observing probe 15.

Particularly, during a time period of carrying out the grasping, the result of measurement by the displacement measuring means 7 is monitored, and therefore, that the sample S is brought into contact with the observing probe 15, that is, the grasping start point can immediately be detected. Specifically, when the sample S is grasped between the observing probe 15 and the grasping probe 16, oscillation of the observing probe 15 is hampered by the pressed sample S, and therefore, the amplitude is attenuated further more than the amplitude at the first set point $P_1$ along the force distance curve. Further, when the amplitude reaches the amplitude ($A_2$) set at the second point $P_2$, it is determined that the grasping is carried out. That is, the time point constitutes the grasping start point.

As described above, the grasping start point can be detected, and therefore, it can be detected with high accuracy whether the grasping of the sample S has been finished. Further, the tweezers 4 are positioned in accordance with the shape of the sample S, and therefore, an optimum position can be grasped and there can be eliminated a possibility of moving the sample S by grasping an impertinent position as in the related art as less as possible. Therefore, the sample S can firmly be grasped. Particularly, an amount of attenuating the amplitude is made to constitute an index, and therefore, the height setting and the grasping of the tweezers 4 can firmly be carried out.

Further, the constant distance ($H_1$) is set to be equal to or smaller than ½ of the height ($H_s$) of the sample S, and therefore, when the sample S is grabbed, contact areas of the styluses 15a and 16a of the two probes 15 and 16 and the sample S can be ensured as much as possible. Therefore, the sample S can further stably be grasped and the manipulation operation can stably be carried out.

Successively, after grasping the sample S, an oscillation of the observing probe 15 is stopped by stopping the piezoelectric member controlling portion 21. Further, the controlling means 9 adjusts a grasping force (pressing amount) by further moving the grasping probe 16 from the grasping start point to the side of the observing probe 15 by a moving amount of ΔS in accordance with a physical property of the sample S. In this way, the grasping force can be adjusted in accordance with the physical property of the sample S, and therefore, the grasping can firmly be carried out without deforming, crushing, or flipping the sample S to thrust to other location as in the related art.

Further, in pressing the two probes 15 and 16 to the sample S, when the sample S falls in a range of a limit of elasticity, a reaction force F (F=ks·ΔS) (ks; synthesized spring constant of the sample S and the two probes 15 and 16) is generated to generate a reaction force against the force of grasping the sample S. On the other hand, in a case of a very soft sample S as in a living body sample S, plastic deformation of the sample S is easily generated and grasping can be carried out by deforming to recess a portion pressed by the two probes 15 and 16. In either of the cases, the grasping force can be adjusted, and therefore, the sample S can firmly be grasped.

Further, after grasping the sample S, the grasped sample S can be carried to an arbitrary position by pulling up the sample S by operating the Z scanner 26 and operating the XY scanner 24.

Further, the grasping start point is grasped, and therefore, the controlling means 9 can also calculate a size (an interval grasped by the two probes 15 and 16) Gs of the sample S from the predetermined gap ($G_0$) and the moving distance ($G_1$) of moving the grasping probe 16 from an initial position to the grasping start point. That is, the size ($G_s$) of the sample S can be calculated by subtracting the moving distance ($G_1$) of moving the grasping probe 16 from the initial position to the grasping start point from the initial interval of the observing probe 15 and the grasping probe 16, that is, the predetermined gap ($G_0$) constituted by the previously known interval (4 μm).

Here, the heating portion 22 constituting the thermal actuator can provide the following calibration curve (quadratic curve) from a relationship between the moving distance ($G_1$) and electricity conduction voltage (V).

$G1=\beta V2$ (β; constant) incidentally, the constant 13 is a numerical value calculated by a statistical processing by measuring a plurality of pieces of samples sizes of which are known.

Therefore, the moving distance ($G_1$) can easily be calculated from the electricity conduction voltage (V) by utilizing the calibration curve. Therefore, the size (Gs) of the sample S can easily be calculated by subtracting the moving distance ($G_1$) from the predetermined gap ($G_0$).

Further, according to the sample manipulating apparatus 1 of the embodiment, after the grasping of the sample S has been finished, it can be detected with high accuracy whether the sample S is detached from the tweezers 4.

In this case, first, the sample S grasped by the tweezers 4 is pressed to the substrate surface 2a by operating the Z scanner 26. In this case, the observing probe 15 is flexed, and therefore, it can accurately be determined whether the sample S is brought into contact with the substrate surface 2a based on a result of measurement by the displacement measuring means 7. Successively, the grasping of the sample S is released by returning the grasping probe 16 to the initial position by heating the heating portion 22 by electricity conduction under the state. Successively, the tweezers 4 are separated from the substrate surface 2a sufficiently by the Z scanner 26. As an example, the tweezers 4 are pulled by a distance equal to or larger than twice as much as much the height (Hs) of the sample S.

After pulling up the tweezers 4, the observing probe 15 is subjected to the self-excited resonance again by applying a voltage to the piezoelectric member 20 and the resonance frequency and the Q value at that occasion are measured. Further, the resonance frequency and the Q value are compared with values of initial free oscillation, that is, values of the predetermined frequency (F0) and the Q value (Q0).

At this occasion, when the sample S is not adhered to the stylus 15a of the observing probe 15 and the sample S is detached therefrom, the observing probe 15 is oscillated in an oscillation state before carrying out the grasping (f0 and Q0, mentioned above). On the other hand, when the sample S is adhered to the stylus 15a of the observing probe 15, the observing probe 15 is oscillated in an oscillation state which differs from the oscillation state before carrying out the grasping.

Further, in this case, the resonance frequency is reduced by the following equation.

$$f2=1/(2\pi)\cdot(k0/(m+ms))^{1/2}$$

(m; mass of the observing probe 15, ms; mass of adhered sample S, $k_0$; a spring constant of the observing probe 15)

In this way, by comparing with the oscillation state before grasping, it can be detected whether the sample S is detached from the observing probe 15. Further, when the sample S is adhered to the observing probe 15, by returning to the operation of pressing the sample S to the substrate surface 2a, the above-described respective operations may be repeated thereafter.

Further, when as a result of comparing with the oscillation state before the grasping, an oscillation state substantially equal thereto is constituted, the grasping probe 16 returned to the initial position is moved again to the grasping start point by heating the heating portion 22 by electricity conduction. Here, in releasing the grasping of the sample S, when the sample S is adhered not to the side of the observing probe 15 but to the side of the stylus 16a of the grasping probe 16, the sample S is grasped again when the grasping probe 16 is returned to the grasping start point, and therefore, the observing probe 15 is displaced. On the other hand, when the sample S is not adhered to the grasping probe 16, the observing probe 15 is not displaced at all. That is, by detecting the oscillation state of the observing probe 15 when the grasping probe 16 is moved again to the grasping start point by the displacement measuring means 7, it may be detected whether the sample S is detached and it can be detected whether the sample S is adhered to the grasping probe 16 by detecting the oscillation state of the observing probe 15.

Further, when the grasping probe 16 is moved by exceeding the grabbing start point until being brought into contact with the observing probe 15, in a case in which the sample S is not adhered to the grasping probe 16, the moving distance ($G_1$) of the grasping probe 16 becomes substantially equal to the predetermined gap ($G_0$). Also in this respect, it can be detected whether the sample S is adhered thereto.

Further, when the sample S is not adhered to the grasping probe 16, it can be determined that the sample S is not squeezed between the two probes 15 and 16 and is firmly moved onto the substrate surface 2$a$ and it can be detected with high accuracy whether the detachment has been finished.

Further, when the grasping probe 16 is adhered with the sample S, by returning to the operation of pressing the sample S to the substrate surface 2$a$, the above-described respective operations may be repeated thereafter.

As described above, according to the sample manipulating apparatus 1 of the embodiment, in grasping the sample S, the state in which the sample S is lightly squeezed between two pieces of the probes, that is, the observing probe 15 and the grasping probe 16 (grasping start point) can be detected. Further, the size (Hs) of the sample S can be measured from the interval between the two probes 15 and 16 at that occasion and grasping can be carried out while pressing the sample S by a constant amount in a range of not deforming the sample S. Therefore, the following effect which has been difficult in the related art can be achieved.

That is, the sample S mounted on the substrate 2 can firmly and swiftly be grasped, it can be detected with high accuracy whether the grasping has been finished, and the manipulation operation can efficiently be carried out. Further, the grasping force can be adjusted in accordance with the sample S, the sample S can firmly be prevented from being deformed, crushed, flipped or the like. Further, it can be detected with high accuracy whether the detachment of the sample S has been finished after finishing to grasp the sample S.

Further, although in the above-described embodiment, the observing probe 15 is periodically brought into contact with the substrate surface 2$a$ during a time period of grasping the sample S after setting the height, in order to further increase a sensitivity of the observing probe 15, it is further preferable to prevent the observing probe 15 from being brought into contact with the substrate surface 2$a$. In this case, after setting the height, the amplitude of the observing probe 15 may be reset to an amplitude of oscillation of observing probe 15 in a noncontact state relative to the substrate surface 2$a$ at the position.

Specifically speaking, from positioning the tweezers 4 shown in FIG. 5A, after setting the height of the tweezers 4 to the height of the constant distance D1 as shown by FIG. 5B, an oscillation frequency is scanned at a vicinity of a resonance frequency and an oscillation amplitude curve (Q curve) at that occasion is measured. However, the amplitude of the piezoelectric member controlling portion 21 is reduced to set to an amplitude of oscillation of observing probe 15 in air even at the resonance point (small oscillation state; amplitude $A_3$). Thereby, as shown by FIG. 5C, after setting the height, the observing probe 15 can be oscillated without being brought into contact with the substrate surface 2$a$. Further, in this case, a point constituting an amplitude ($A_4$) smaller than the reset amplitude ($A_3$) may be set as the second set point $P_2$.

Successively, by heating the heating portion 22 by electricity conduction by the heating power source 23 at the set height, the grasping probe 16 is moved to the side of the observing probe 15 and the distance between the observing probe 15 and the grasping probe 16 is made to be shorter than the predetermined gap ($G_0$). Then, the stylus 16$a$ of the grasping probe 16 is brought into contact with the sample S as shown by FIG. 5D, and starts pressing the sample S to the observing probe 15 by further moving the stylus 15$a$. Further, as shown by FIG. 5E, by bringing the sample S into contact with the stylus 15$a$ of the observing probe 15, the sample S can be grasped by the two probes 15 and 16. Further, it is determined that the grasping is carried out when the amplitude reaches the amplitude ($A_4$) set at the second set point $P_2$. That is, the time point constitutes the grasping start point.

Particularly, after setting the height, the observing probe 15 can be brought into the noncontact state relative to the substrate surface 2$a$, and therefore, the sensitivity of the observing probe 15 can be increased by enabling to constitute an index only by the attenuated value by grasping the sample by disregarding a change in the amplitude owing to the contact with the substrate surface 2$a$. Therefore, it can be detected with high accuracy that the sample S is grasped by constituting the index by the attenuated value of the amplitude.

Further, although according to the first embodiment, the observing probe 15 is oscillated and the oscillation amplitude is attenuated to reach predetermined values (first set point $P_1$, second set point $P_2$), thereby, the grasping start point is detected, the sample S may be grasped while detecting the grasping start point in a state of stopping the oscillation of the observing probe 15.

In this case, the respective constituent products may be controlled by the controlling means 9 such that after positioning has been finished, the tweezers 4 and the substrate 2 are made to be proximate to each other in a state of stopping the oscillating means 6, the height is set when flexing of the observing probe 15 reaches a previously determined rectified value, and the grasping start point is detected when twist of the observing probe 15 is measured. A method in this case will be explained specifically as follows.

Here, an explanation will be given by taking an example of a case of setting the height by temporarily bringing the tweezers 4 and the substrate 2 into constant with each other, thereafter, separating the tweezers 4 and the substrate 2 until flexing of the observing probe 15 reaches the rectified value.

First, after observation of the sample S has been finished, the tweezers 4 are positioned in a state of stopping the oscillation of the observing probe 15. Successively, after making the tweezers 4 and the substrate 2 proximate to each other by the Z scanner 26 as shown by FIG. 6A, the both are brought into contact with each other. At this occasion, when the observing probe 15 is made to be proximate to the substrate 2, flexing thereof is increased by pressing the observing probe 15 to the substrate 2 to reach a constant value. Therefore, when the value is detected, it is determined that the tweezers 4 and the substrate 2 are brought into contact with each other and the Z scanner 26 is stopped.

Successively, by operating the Z scanner 26 again, as shown by FIG. 6B, the tweezers 4 and the substrate 2 are made to be remote from each other gradually. That is, the operation of pulling up the tweezers 4 is carried out. Further, at a time point at which the flexing of the observing probe 15 reaches the rectified value by releasing from pressing to the substrate 2, the Z scanner 26 is stopped and the Z servo system is locked to fix the height. Further, the rectified value is previously set such that the height (Hv) at this occasion becomes equal to or smaller than ½ of the height (Hs) of the sample S. Thereby, the tweezers 4 are set to a height of being remote from the substrate surface 2$a$ by the constant distance (Hv).

Successively, as shown by FIG. 6C, the grasping probe 16 is moved to the side of the observing probe 15 by heating the heating portion 22 by electricity conduction and the sample S is moved to the observing probe 15. Further, when the sample S is brought into contact with the observing probe 15 and the grasping is started as shown by FIG. 6D, the observing probe 15 is pressed by the sample S, and therefore, twisting is produced. Then, the light detecting portion 32 detects a twist signal from a position of incidence of laser light L incident thereon after having been reflected by the reflecting face of the observing probe 15. Therefore, when the twisting of the observing probe 15 is measured, the controlling means 9 determines that the grasping is carried out. That is, the time point constitutes the grasping start point.

In this way, even in the state of stopping the oscillation of the observing probe 15, the height setting of the tweezers 4 and the grasping of the sample S can firmly be carried out. Particularly, the oscillation of the observing probe 15 is stopped, and therefore, even the hard sample S or the sample S having a large size (for example, 1 μm or more) can stably be grasped.

Further, even in a case in which the twisting of the observing probe 15 is not detected, the case signifies that the sample S is not grasped correctly.

Further, the technical range of the invention is not limited to the above-described embodiment but can variously be modified within the range not deviated from the gist of the invention.

For example, although the embodiment is constituted by the scanning system of moving the side of the tweezers 4 in Z direction and the side of the sample base 3 in XY directions, the embodiment is not limited to the case but the side of the tweezers 4 may be moved in three-dimensional directions, or the side of the sample base 3 may be constituted to move in three-dimensional directions. In either of the cases, only the scanning system differs and operation and effect similar to those of the embodiment can be achieved.

Further, although in the embodiment, the displacement measuring means 7 detects the displacement of the observing probe 15 by the optical lever system, the embodiment is not limited to the optical lever system, for example, the observing probe 15 per se may adopt a self detecting system provided with a displacement detecting function (for example, piezoelectric resistance element or the like).

Further, although in the embodiment, when the sample S is grasped while oscillating the observing probe 15, the observing probe 15 is oscillated by self-excited resonance oscillation in Z direction orthogonal to the substrate surface 2a, the embodiment is not limited to the case, but the observing probe 15 may be oscillated by self-excited resonance oscillation in the twisting direction. Even in the case, similar operation and effect can be achieved.

Further, although in the embodiment, the probe driving means 8 moves the grasping probe 16 to the side of the observing probe 15 by utilizing the heating portion 22 constituting the thermal actuator, the embodiment is not limited to the thermal actuator.

For example, the grasping probe 16 may be moved by an electrostatic capacitance actuator system. In this case, as in schematic views shown in FIG. 7 and FIG. 8, portions of the main body portion 15b of the observing probe 15 and the main body portion 16b of the grasping probe 16 may be formed respectively in recessed and projected shapes to form comb teeth, and may be constituted to form electrodes 40 and 41 respectively at regions thereof constituting the comb teeth.

In this case, the comb teeth can move in Y direction by applying a voltage between the two electrodes 40 and 41, and as a result thereof, the grasping probe 16 can be moved to the side of the observing probe 15. Therefore, even in the case, operation and effect similar to those of the embodiment can be achieved.

However, when the electrostatic actuator system is adopted, in moving the grasping probe 16 an effect of heat drift is difficult to be received as in the thermal actuator, and therefore, the electrostatic actuator system is advantageous in measuring the size of the sample S or adjusting the grasping force.

Further, an explanation will be given as follows of a way of calculating the moving distance ($G_1$) from the initial position when the grasping probe 16 is moved by adopting the electrostatic actuator system.

First, an electrostatic capacitance among the comb teeth is designated by notation C, a voltage among the comb teeth is designated by notation V, and a direction of moving the comb teeth is constituted by Y axis. Then an electrostatic force (Fc) generated among the comb teeth becomes as follows.

$$Fc = (1/2) \cdot (\delta C/\delta Y) \cdot V^2$$

Here, when a spring constant of the tweezers 4 is designated by notation k, and a moving distance of the comb teeth is designated by notation $X_0$, a spring force Fs of the tweezers 4 and an electrostatic force Fc are balanced, $$Fc = Fs = (1/2) \cdot (\delta C/\delta Y) \cdot V^2 = X_0 \cdot k$$

Therefore, $$X0 = (1/2) \cdot (\delta C/\delta Y) \cdot V^2 \cdot (1/k)$$

Therefore, the moving distance (G1) becomes as follows.

$$G1 = (m/2) \cdot (1/2) \cdot (\delta C/\delta Y) \cdot V^2 \cdot (1/k)$$

Further, notation m designates a magnification (moving distance of front end of probe/moving distance of comb teeth).

In the above-described equation, m, k, C are numerical values determined by a shape, a material and an atmosphere of the tweezers 4, and can be made to be constant in a normal room temperature operation in the atmosphere. Therefore, a calibration curve of $G_1$ and the applied voltage V, that is, $G1 = \alpha V_2$ (quadratic curve) ($\alpha$; constant) can be calculated by grasping the sample S of, for example, a known thickness and calculating a comb teeth applying voltage at the grasping start point.

As a result, the moving distance ($G_1$) of the grasping probe 16 can easily be calculated based on the above-described equation and the applied voltage (V). Therefore, even in the electrostatic actuator system, the size (Gs) of the sample S can be calculated by subtracting the moving distance ($G_1$) from the predetermined gap ($G_0$). However, as described above, the electrostatic actuator system is difficult to be influenced by the thermal drift, and therefore, the size (Gs) of the sample S can be calculated further accurately.

What is claimed is:

1. A sample manipulating apparatus which does manipulation for a sample mounted on a surface of a substrate, the sample manipulating apparatus comprising:
   a stage of fixing the substrate;
   tweezers comprising an observing probe and a grasping probe contiguously arranged in a state of being spaced apart from each other by a predetermined gap and respectively having styluses arranged opposedly to each other at the surface of the substrate at front ends thereof;
   moving means for moving the substrate and the tweezers relatively in a direction parallel with the surface of the substrate and a direction orthogonal to the surface of the substrate;
   oscillating means for oscillating the observing probe by a predetermined frequency and a predetermined amplitude;
   displacement measuring means for measuring a displacement of the observing probe;
   probe driving means for moving the grasping probe to a side of the observing probe to make the two probes proximate to each other more than the predetermined gap; and controlling means for controlling the moving means, the oscillating means and the probe driving means;

wherein the controlling means acquires at least position data and shape data of the sample by observing the sample by an AFM observation of oscillating the observing probe, thereafter, positions the tweezers by the moving means such that the sample is positioned between the observing probe and the grasping probe based on the two data, after positioning, sets a height of the tweezers at a position remote from the surface of the substrate by a constant distance by the moving means while monitoring a result of measurement by the displacement measuring means, thereafter, moves the grasping probe to the side of the observing probe by the probe driving means while monitoring the result of measurement by the displacement measuring means at the set height, and causes the sample to be grasped while detecting a grasping start point.

2. The sample manipulating apparatus according to claim 1;

wherein the controlling means makes the tweezers and the substrate proximate to each other in an oscillation state of the observing probe by the predetermined frequency and predetermined amplitude by the oscillating means after finishing the positioning, sets the height when the amplitude of the observing probe is attenuated by being brought into contact with the substrate to reach a first attenuated value smaller than the predetermined amplitude by a previously determined amount and detects the grasping start point when the amplitude is further attenuated by pressing the sample to the observing probe to reach a second attenuated value smaller than the first attenuated value by a previously determined amount.

3. The sample manipulating apparatus according to claim 2;

wherein the controlling means makes the amplitude of the observing probe reset an amplitude of oscillation of the observing probe in a noncontact state relative to the surface of the substrate after setting the height at the position.

4. The sample manipulating apparatus according to claim 2;

wherein in setting the height, the first attenuated value is set such that the constant distance becomes equal to or smaller than ½ of the height of the sample.

5. The sample manipulating apparatus according to claim 1;

wherein the controlling means makes the tweezers and the substrate proximate to each other in a state of stopping the oscillating means after finishing the positioning, sets the height when flexing of the observing probe reaches a previously determined rectified value, and detects the grasping start point when the twisting of the observing probe is measured by pressing the sample to the observing probe.

6. The sample manipulating apparatus according to claim 5;

wherein the controlling means temporarily brings the tweezers and the substrate into contact with each other when the height is set, thereafter, sets the height by making the tweezers and the substrate remote from each other until the flexing of the observing probe reaches the rectified value.

7. The sample manipulating apparatus according to claim 5;

wherein in setting the height, the rectified value is set such that the constant distance becomes equal to or smaller than ½ of the height of the sample.

8. The sample manipulating apparatus according to any one of claims 1 through 7;

wherein the controlling means adjusts a grasping force by further moving the grasping probe to the side of the observing probe from the grasping start point in accordance with a physical property of the sample.

9. The sample manipulating apparatus according to claim 8;

wherein the controlling means calculates a size of the sample from the predetermined gap and a moving distance of moving the grasping probe from an initial position to the grasping start point.

10. The sample manipulating apparatus according to claim 1;

wherein the controlling means moves the grasping probe in a direction of being remote from the observing probe to return to the initial position after finishing to grasp the sample and makes the tweezers remote from the surface of the substrate, thereafter, oscillates the observing probe and detects whether the sample is detached by comparing an oscillation state at this occasion and the oscillation state before grasping the sample.

11. The sample manipulating apparatus according to claim 10;

wherein the controlling means detects whether the sample is detached by moving the grasping probe again to the side of the observing probe after the grasping start point is reached again after comparing the oscillation states.

12. The sample manipulating apparatus according to claim 11;

wherein the control means further detects whether the sample is detached by detecting the oscillation state of the observing probe by the displacement detecting means when the grasping probe is moved to reach again the grasping start point.

* * * * *